United States Patent [19]

Schotsman

[11] 4,185,406
[45] Jan. 29, 1980

[54] MULTISLIDE HOLDER AND EDITOR AND CABINET THEREFOR

[76] Inventor: Simon C. Schotsman, 7 McIntosh Ave., Hamilton, Ontario, Canada, L9B 1J3

[21] Appl. No.: 886,273

[22] Filed: Mar. 13, 1978

[51] Int. Cl.² ............................................. G02B 27/02
[52] U.S. Cl. .................................. 40/361; 40/158 B; 40/405
[58] Field of Search ..................... 40/158 B, 158, 159, 40/156, 361, 363, 365, 366, 367, 405, 373, 452; 355/127

[56] References Cited

U.S. PATENT DOCUMENTS

| | | | |
|---|---|---|---|
| 2,913,842 | 11/1959 | Middents | 40/367 |
| 2,943,410 | 7/1960 | Haggar | 40/367 |
| 3,500,569 | 3/1970 | Simmons | 40/564 |

*Primary Examiner*—John F. Pitrelli
*Assistant Examiner*—G. Lee Skillington
*Attorney, Agent, or Firm*—Stanley J. Rogers

[57] ABSTRACT

A multislide holder and editor comprises a rectangular plate-like body having a plurality of rectangular slide-receiving pockets formed between two sets of parallel ribs disposed at right angles to one another. Upon insertion into its respective pocket each slide enters two spaced parallel open-ended side edge engaging channels, each channel comprising two spaced edge-engaging members. One of these edge engaging members comprises at least two longitudinally spaced portions with a gap between them, while the other cooperating member is disposed opposite this gap and is of not greater length than the gap, so that the entire body can be formed by a single molding operation with linearly-moving relatively simple mold parts. A cabinet for the holder and editor has a source of illumination in the cabinet door, and a plurality of the holders are mounted by channel members on the top and bottom inner wall to move parallel to the door in its open position, so that they can be positioned in front of the door for inspection and editing. The door can be readily removed to serve as a separate light source for viewing and editing.

7 Claims, 6 Drawing Figures

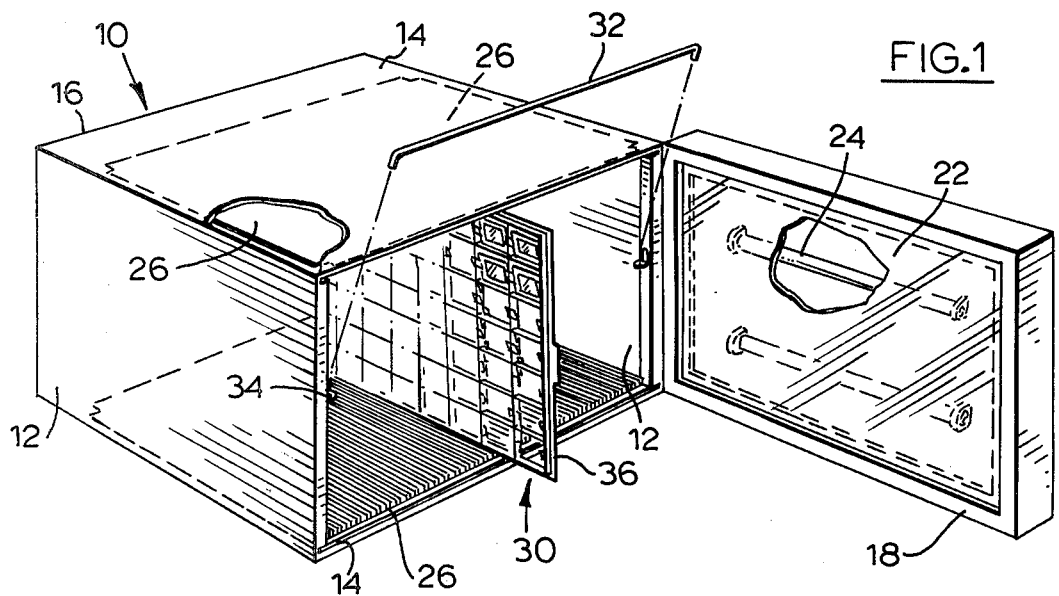
FIG.1
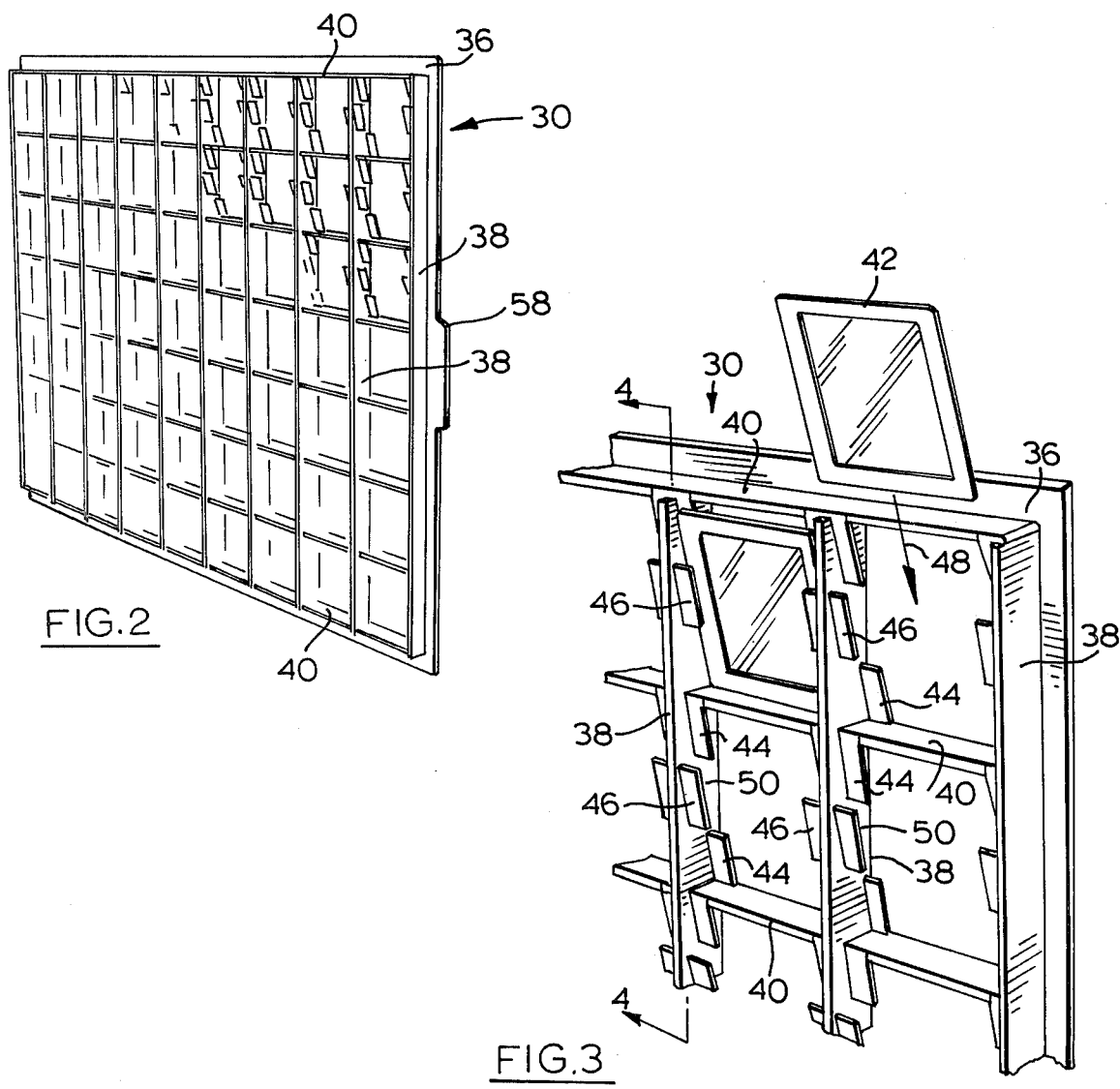
FIG.2
FIG.3

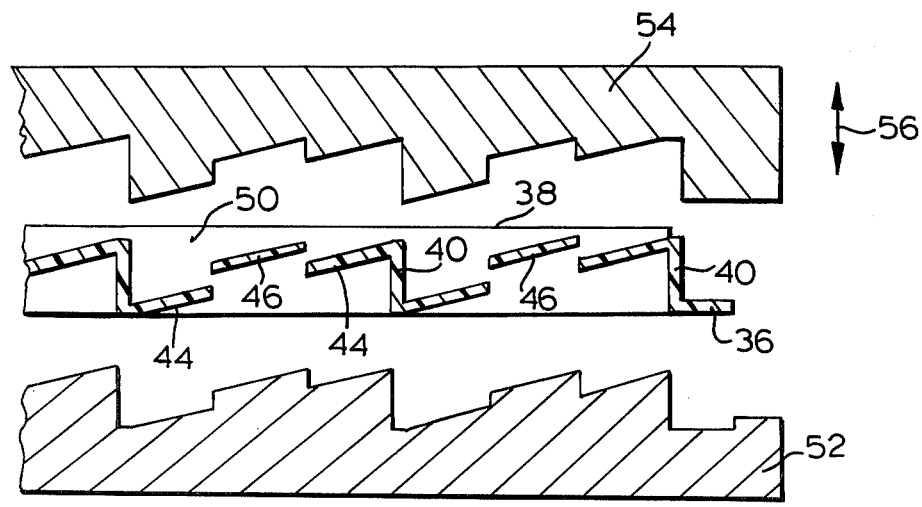
FIG.4
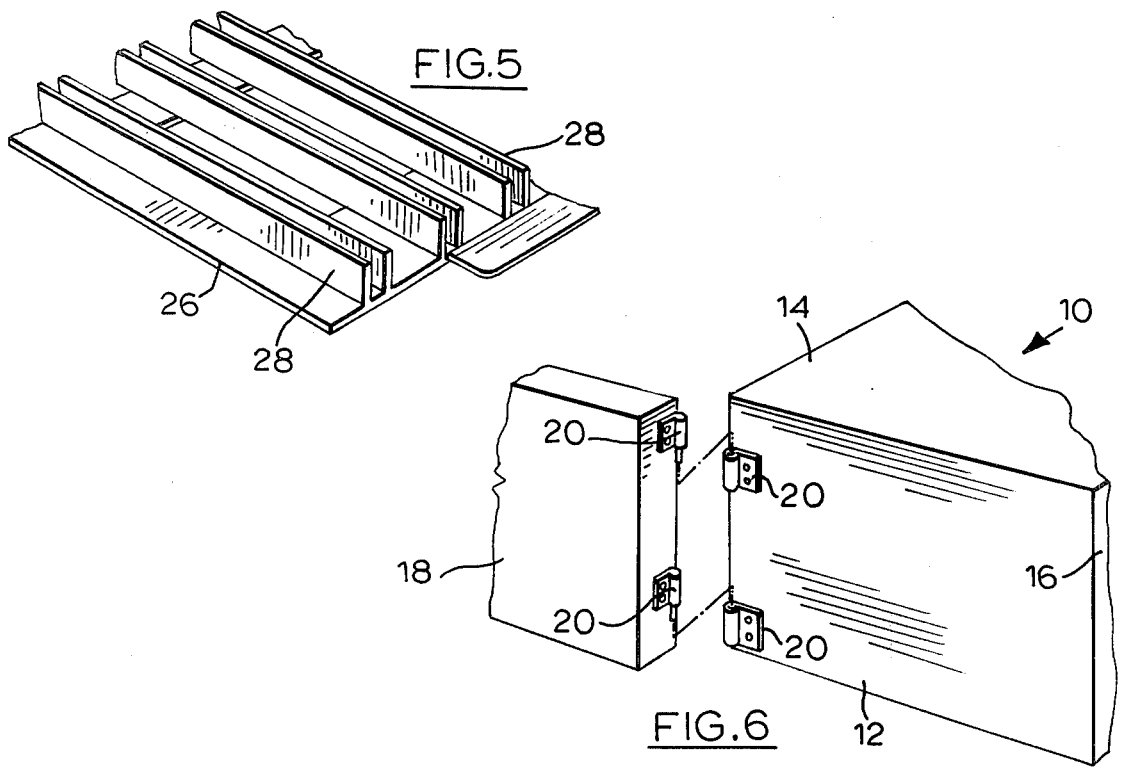
FIG.5
FIG.6

MULTISLIDE HOLDER AND EDITOR AND CABINET THEREFOR

FIELD OF THE INVENTION

The present invention is concerned with improvements in or relating to holders of the kind receiving a plurality of slides for various purposes, such as storage, viewing and editing thereof. The invention is also concerned with improvements in or relating to cabinets for receiving and storing a plurality of such holders.

Review of the Prior Art

A number of proposals have been made hitherto to provide a multislide holder and editor for photographic slides and a novelty search in the U.S. Patent Office prior to the preparation of this present application in the Examiner's domestic and foreign art collection in Class 40, subclasses 158B; 159; 104.18 and 106.1 revealed the following U.S. Pat. Nos. as of interest only; namely 1,853,197 (Bosworth); 3,277,598 (Lightburn); 3,431,667 (Woods); 3,466,126 (Sakamoto); 3,543,426 (Sakamoto; 3,727,334 (Sakamoto); 3,958,348 (Sakamoto) and 3,973,344 (Frankel). The Sakamoto patents are all concerned with multislide holders that are somewhat complex in structure, and consequently will be relatively expensive to produce. Any professional or amateur photographer faced with the problem of storing and editing photographic slides will be the owner of a large number and the cost of providing sufficient holders and cabinets for the holders then becomes considerable, and in many cases prohibitive.

Definition of the Invention

It is therefore an object of the invention to provide a new multislide holder and editor of simple form.

It is also an object to provide a multislide holder and editor that is adapted for molding from plastic material as a single integral unit, employing relatively simple molds and molding procedures.

It is a further object to provide a new cabinet for a multislide holder and editor that incorporates a slide illuminating means in a simple and effective manner to permit ready viewing of the slides.

In accordance with the present invention there is provided a multislide holder and editor comprising a rectangular plate-like body providing a plurality of pockets each receiving a respective slide therein, the pockets being formed between a first plurality of spaced parallel wall-forming rib members extending parallel to two of the body edges, and a second plurality of spaced parallel wall-forming rib members extending parallel to the other two body edges and at right angles to the said first plurality, each pocket having on each of two opposite side walls thereof two spaced substantially parallel slide edge-engaging members providing between themselves an open-ended channel for receiving therein a slide edge to support the slide in the holder pocket, a first one of said edge engaging members comprising at least two longitudinally-spaced portions having at least one gap between them, and the second of said edge-engaging members comprising at least one portion each disposed opposite to and in register with a respective gap in the first edge-engaging member and of length not greater than that of the said respective registering gap.

Also in accordance with the invention there is provided a cabinet for a multislide holder and editor comprising a body of rectangular cross section having two first opposite side walls and two second opposite side walls and a first end wall, a rectangular door member of approximately the size of the said first end wall hingedly mounted to the body for movement between a closed position in which it closes the other end of the body and an open position in which it is coplanar with a first side wall;

light-producing means mounted by the door member inner side to provide illumination at the door member inner side, channel forming members on the interior surfaces of the two second opposite cabinet side walls providing a plurality of spaced pairs of channels, each channel pair receiving therein a respective plate-like multislide holder body of the invention for movement between a stored position in which it is inside the cabinet, and a viewing position in which it is parallel to and registers with the door in open position for slides in the holder to be viewed by the illumination of the said light-producing means.

DESCRIPTION OF THE DRAWINGS

Particular preferred embodiments of the invention will now be described, by way of example, with reference to the accompanying diagrammatic drawings, wherein:

FIG. 1 is a perspective view of a cabinet of the invention with the door thereof in the open position for slide viewing and with a slide holder and editor of the invention partly withdrawn from the cabinet;

FIG. 2 is a perspective view of a slide holder and editor of the invention, only a few of the slide receiving channels in the individual pockets being shown for simplicity of illustration;

FIG. 3 is a fragmentary view of part of the holder of FIG. 2 drawn to a larger scale to show the detail thereof;

FIG. 4 is a plane section taken on the line 4—4 of FIG. 3 to illustrate the molds and molding procedure that can be used for the manufacture of the holder;

FIG. 5 is a fragmentary perspective view of a part of a channel-forming member employed in the cabinet for mounting the holders therein; and FIG. 6 illustrates the removability of the cabinet door to permit it to be used apart from the cabinet.

DESCRIPTION OF THE PREFERRED EMBODIMENTS

An open-ended cabinet 10 of the invention is of rectangular cross section having two parallel first vertical side walls 12 and two parallel second horizontal side walls 14, and a vertical end wall 16. The open end of the cabinet is provided with a door 18 hinged by hinges 20 (FIG. 6) to one of the first side walls 12. The hinges 20 are of a type which permit the door to be readily removed and replaced. The door is of hollow construction and comprises illumination means which in this embodiment are constituted by a translucent sheet 22 forming the inner face of the door and one or more lamps 24 mounted behind the sheet 22. The means for supplying operating current to the lamps 24 are not illustrated.

Each horizontal wall 14 has mounted on the inner surface thereof a flat molded plate-like member 26 having projected from one face pairs of spaced parallel ribs 28 (FIG. 5), each pair forming a respective channel for the reception of the edge portion of a respective slide holder and editor 30. The two opposed members 26 are disposed on their respective walls so that they mount vertically a plurality of the holders 30 for movement into and out of the cabinet between a stored position inside the cabinet, and a viewing position in which they are parallel to and register with the door 18 in its open position. It will be seen therefore that with the slide holder in front of the door the slides can be viewed using the built-in door illumination, without disengaging the holder from its mounting channels. If desired, the door can be removed and used with the holder as a conventional horizontally-disposed light box, the holder lying on the translucent panel 22. The holders are retained within the cabinet by a wire rod 32, the turned ends of which are engaged in sockets 34 at the sides of the cabinet front opening.

The slide holder and editor 30 of the invention consists of an integral molded plastic plate-like member, e.g. of high impact polystyrene, of rectangular shape with a rectangular surrounding protruding edge portion 36. The body has a first plurality of spaced parallel pocket-forming rib members 38 extending parallel to two of the edges, and a second plurality of such rib members 40 extending at right angles to the rib members 38, so as to form a corresponding plurality of slide receiving pockets, each adapted to receive a slide 42. Each pocket is provided on its opposite side walls formed by the ribs 38 with two spaced parallel edge-engaging members 44 and 46, which provide between themselves respective open-ended channels each receiving a side edge of the slide as illustrated in FIG. 3, upon insertion of the slide in the direction of the arrow 48. The channels are inclined downwards in the plane of the member when it is disposed horizontally, so that the slides will tend to move under gravity to the bottoms of their respective channels.

In this particular embodiment each edge engaging member 44 is the lower member and is constituted by two longitudinally-spaced endmost portions having a central gap 50 between them, while the upper member 46 is constituted by a single portion only disposed centrally opposite to the gap 50, the portion being as long as possible, but of a length not greater than that of the gap. It will be seen that such a structure provides adequate support and retention of the slide in all positions of the holder, except of course with the open ends of the channels downwards. In other embodiments one of the edge engaging members can comprise more than two separate longitudinally-spaced portions with more than one gap, while the other member comprises a number of portions equal to or less than the number of gaps, each portion being not longer than the gap with which it registers. The portions can of course be a little shorter than the registering gap if desired, and if a larger number of portions are provided then not every gap may require a respective registering portion.

As is illustrated by FIG. 4, because of the particular construction of the slide edge-engaging members 44 and 46, the holder of the invention can be molded as a unitary structure, using two relatively simple registering mould parts 52 and 54 movable linearly toward and away from each other, as indicated by the arrow 56. The cost of production of the holders is thereby minimized. Another feature reducing the cost of production is that the holders 30 and the members 26 are of substantially the same size and shape, so that the same mold backing plates can be used for the two parts. The holder 30 has a protruding handle 58 for grasping by an operator molded as an integral part of the edge 36.

I claim:

1. A cabinet for a multislide holder and editor comprising a body of rectangular cross section having two first opposite side walls and two second opposite side walls and a first end wall, a rectangular door member of approximately the size of the said first end wall hingedly mounted to the body for movement between a closed position in which it closes the other end of the body and an open position in which it is coplanar with a first side wall, light-producing means mounted on the door member to provide illumination at the door member inner side, channel forming members on the interior surfaces of the two second opposite cabinet side walls providing a plurality of spaced pairs of channels, each channel pair receiving therein a respective plate-like multislide holder body for movement between a stored position in which it is inside the cabinet, and a viewing position in which it is parallel to and register with the door in open position for slides in the holder to be viewed by the illumination of the said light producing means, wherein the said plate-like multislide holder body comprises a rectangular plate-like body providing a plurality of pockets each receiving a respective slide therein, the pockets being formed between a first plurality of spaced parallel wall-forming rib members extending parallel to two of the body edges, and a second plurality of spaced parallel wall-forming rib members extending parallel to the other two body edges and at right angles to the said first plurality, each pocket having on each of two opposite side walls thereof two spaced substantially parallel slide edge-engaging member providing between themselves an open-ended channel for receiving therein a slide edge to support the slide in the holder pocket, a first one of said edge-engaging members comprising at least two longitudinally-spaced portions having at least one gap between them, and the second of said edge-engaging members comprising at least one portion each disposed opposite to and in register with a respective gap in the first edge-engaging member and of length not greater than that of the said respective registering gap.

2. A multislide holder and editor comprising a rectangular plate-like body providing a plurality of pockets each receiving a respective slide therein, the pockets being formed between a first plurality of spaced parallel wall-forming rib members extending parallel to two of the body edges, and a second plurality of spaced parallel wall-forming rib members extending parallel to the other two body edges and at right angles to the said first plurality, each pocket having on each of two opposite side walls thereof two spaced substantially parallel slide edge-engaging members providing between themselves an open-ended channel for receiving therein a slide edge to support the slide in the holder pocket, a first one of said edge-engaging members comprising at least two longitudinally-spaced portions having at least one gap between them, and the second of said edge-engaging members comprising at least one portion each disposed opposite to and in register with a respective gap in the first edge-engaging member and of length not greater than that of the said respective registering gap.

3. A holder as claimed in claim 2, wherein each first edge-engaging member consists of two longitudinally-spaced endmost portions with a single central gap between them, and the respective second edge-engaging member comprises a single centrally disposed portion disposed opposite to the said single gap and of length substantially that of the gap but not greater than that of the gap.

4. A holder as claimed in claim 2, wherein said parallel edge-engaging members are inclined at a small angle to the plane of the plate-like body, so that with the body horizontal the channel closed ends are below the channel open ends for slides received therein to move under gravity toward the closed ends.

5. A holder as claimed in claim 2, wherein the said plate-like body is formed by a molding operation with the said wall-forming rib members and slide edge-engaging members integral with one another.

6. A holder as claimed in claim 2, wherein said plate-like body comprises a surrounding edge portion from which the outermost rib members protrude, the said edge portion having a protruding portion forming a handle for grasping by the hand of an operator.

7. A holder as claimed in claim 2, in combination with a cabinet therefor, the cabinet comprising a body of rectangular cross section having two first opposite side walls and two second opposite side walls and a first end wall, a rectangular door member of approximately the size of the said first end wall hingedly mounted to the body for movement between closed and open positions, channel forming members on the interior surfaces of the two second opposite cabinet side walls providing a plurality of spaced pairs of channels, each channel pair receiving therein a respective plate-like multislide holder body for movement between a stored position in which it is inside the cabinet, and a viewing position in which it is at least partly outside the cabinet, wherein each channel-forming member comprises a molded plate-like body having a plurality of pairs of parallel ribs extending from one face thereof, each pair of ribs forming a respective channel for the reception of an edge portion of a respective multislide holder body, and wherein the said molded plate-like body forming the holder-receiving channels and the plate-like multislide holder body are of substantially the same size and shape.

* * * * *